US012308907B2

(12) United States Patent
Dreiling

(10) Patent No.: US 12,308,907 B2
(45) Date of Patent: May 20, 2025

(54) DYNAMICALLY ADJUSTING ANTENNA BEAM DIRECTIVITY BASED ON ORIENTATION OF DEVICE

(71) Applicant: T-MOBILE INNOVATIONS LLC, Overland Park, KS (US)

(72) Inventor: Ryan P. Dreiling, Shawnee, KS (US)

(73) Assignee: T-Mobile Innovations LLC, Overland Park, KS (US)

( * ) Notice: Subject to any disclaimer, the term of this patent is extended or adjusted under 35 U.S.C. 154(b) by 0 days.

(21) Appl. No.: 18/465,044

(22) Filed: Sep. 11, 2023

(65) Prior Publication Data

US 2025/0088224 A1    Mar. 13, 2025

(51) Int. Cl.
*H04B 7/0426*    (2017.01)
*H04B 7/06*    (2006.01)

(52) U.S. Cl.
CPC ........... *H04B 7/043* (2013.01); *H04B 7/0608* (2013.01)

(58) Field of Classification Search
CPC .............................. H04B 7/043; H04B 7/0608
See application file for complete search history.

(56) References Cited

U.S. PATENT DOCUMENTS

| 6,751,442 | B1 * | 6/2004 | Barrett | H01Q 21/005 |
| | | | | 455/13.1 |
| 6,862,433 | B2 * | 3/2005 | Callaway, Jr. | H01Q 1/241 |
| | | | | 343/702 |
| 9,147,935 | B2 | 9/2015 | Keidar | |
| 10,852,418 | B2 * | 12/2020 | Wodrich | B60T 8/171 |
| 11,891,975 | B2 * | 2/2024 | Sheldon-Coulson | |
| | | | | H02K 7/1823 |
| 2002/0196180 | A1 * | 12/2002 | Chang | G01S 19/02 |
| | | | | 342/357.57 |
| 2006/0232468 | A1 * | 10/2006 | Parker | H01Q 1/241 |
| | | | | 342/359 |

(Continued)

FOREIGN PATENT DOCUMENTS

CN    115939758 A    4/2023

OTHER PUBLICATIONS

Extended European Search Report received for European Application No. 24199605.7, mailed on Feb. 10, 2025, 9 pages.

*Primary Examiner* — Dominic E Rego
(74) *Attorney, Agent, or Firm* — Shook, Hardy & Bacon L.L.P.

(57) ABSTRACT

The technology disclosed herein relates to antenna beam directivity corresponding to one or more non-terrestrial access nodes. For example, a user device having antenna elements and a sensor can determine an orientation of the user device and transmit one or more signals from one or more antenna elements based on the orientation of the user device. In embodiments, the user device can transmit signals towards a non-terrestrial access node, towards a portion of an atmosphere layer of the Earth, away from a gravitational force of the Earth, towards outer space, in another non-terrestrial direction, or one or more combinations thereof. In some embodiments, the user device uses one or more accelerometers and/or one or more other sensors for determining the orientation of the user device relative to the antenna elements of the device, the gravitational force of the Earth, a geomagnetic field, another direction, or one or more combinations thereof.

20 Claims, 6 Drawing Sheets

(56) References Cited

U.S. PATENT DOCUMENTS

| | | | | |
|---|---|---|---|---|
| 2012/0075483 | A1* | 3/2012 | Paoletti | G06V 40/166 |
| | | | | 348/207.1 |
| 2013/0120458 | A1* | 5/2013 | Celebisoy | G06F 3/147 |
| | | | | 345/619 |
| 2013/0214970 | A1* | 8/2013 | Stachow | H04W 24/02 |
| | | | | 342/359 |
| 2014/0146205 | A1* | 5/2014 | Xu | H04N 23/683 |
| | | | | 348/239 |
| 2015/0198440 | A1* | 7/2015 | Pearlman | G01S 17/86 |
| | | | | 356/4.01 |
| 2016/0156391 | A1* | 6/2016 | Fujii | H04L 25/0202 |
| | | | | 455/63.4 |
| 2016/0238189 | A1* | 8/2016 | Angel | F24S 25/70 |
| 2016/0308626 | A1* | 10/2016 | Mow | H04B 17/14 |
| 2017/0030703 | A1* | 2/2017 | Cosic | G01S 13/86 |
| 2017/0042488 | A1* | 2/2017 | Muhsin | G06T 11/206 |
| 2018/0063317 | A1* | 3/2018 | Simpson | H04M 1/72445 |
| 2018/0091194 | A1* | 3/2018 | Matsui | G06K 19/077 |
| 2018/0103874 | A1* | 4/2018 | Lee | A61B 5/6823 |
| 2018/0272221 | A1* | 9/2018 | Sundararajan | G09B 9/00 |
| 2018/0304702 | A1* | 10/2018 | Urano | H04B 1/3822 |
| 2019/0155477 | A1* | 5/2019 | Busby | G06F 3/03543 |
| 2019/0346280 | A1* | 11/2019 | Mutschler | G06N 20/00 |
| 2020/0128307 | A1* | 4/2020 | Li | H04N 19/119 |
| 2020/0193865 | A1* | 6/2020 | Redgård | A61B 5/1122 |
| 2020/0401224 | A1* | 12/2020 | Cotton | A61B 5/742 |
| 2021/0124882 | A1* | 4/2021 | Uchimura | G06K 19/0723 |
| 2021/0132175 | A1* | 5/2021 | Matsuoka | H01Q 3/36 |
| 2022/0014255 | A1* | 1/2022 | Acker | H04W 24/08 |
| 2022/0225118 | A1* | 7/2022 | Pefkianakis | H04W 64/006 |
| 2022/0331124 | A1* | 10/2022 | Hodrinsky | B33Y 10/00 |
| 2022/0364919 | A1* | 11/2022 | Rinaldi | G01J 5/40 |
| 2023/0280742 | A1* | 9/2023 | Bachrach | G05D 1/0044 |
| | | | | 701/2 |
| 2023/0370122 | A1* | 11/2023 | Gunzelmann | H04B 7/04013 |
| 2024/0013193 | A1* | 1/2024 | Kolchin | G06Q 20/352 |

* cited by examiner

DYNAMICALLY ADJUSTING ANTENNA BEAM DIRECTIVITY BASED ON ORIENTATION OF DEVICE

SUMMARY

This summary provides a high-level overview of various aspects of the technology disclosed herein, and the detailed-description section below provides further description herein. This summary is not intended to identify key features or essential features of the claimed subject matter, nor is it intended to be used as an aid in isolation to determine the scope of the claimed subject matter. The present disclosure is directed, in part, to technology associated with adjustments to beam directivity based on orientation, substantially as shown in and/or described in connection with at least one of the figures, and as set forth more completely in the claims.

In aspects set forth herein, and at a high level, the technology described herein generally relates to beam directivity based on orientation. For example, a user device having antenna element(s), sensor(s), processor(s), and computer memory storing computer-usable instructions that cause the user device to perform operations, can determine an orientation of the user device, using at least one sensor, based on one or more of the antenna elements of the user device, a direction of a gravitational force, a direction of Earth's atmosphere or another physical property associated with a direction away from the crust of the earth or an interior of the Earth, a direction of a physical property associated with outer space, or one or more combinations thereof.

In embodiments, based on determining the orientation of the user device, the user device can transmit a signal (e.g., a beam, a radio frequency, a radio frequency pattern) towards a portion of an atmosphere layer of the Earth, towards outer space, away from the Earth's crust or an interior portion of the Earth, away from a gravitational force, or one or more combinations thereof, using at least one of the antenna elements of the user device. In some embodiments, the sensor is an accelerometer. In some embodiments, the user device determines the orientation of a phased antenna array of the user device using a plurality of accelerometers coupled to the user device. In some embodiments, one or more output signals of the accelerometer(s) or other sensor(s) of the user device are used in a feedback loop mechanism to fine-tune the radio frequency, beam, or radiation pattern transmitted by one or more antenna elements of the user device towards a portion of an atmosphere layer of the Earth, towards outer space, away from the Earth's crust or an interior portion of the Earth, away from a gravitational force, or one or more combinations thereof, even after the user device is rotated or while the user device is rotating.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE SEVERAL VIEWS OF THE DRAWINGS

Implementations of the present disclosure are described in detail below with reference to the attached drawing figures, wherein.

DETAILED DESCRIPTION

Figure 1:
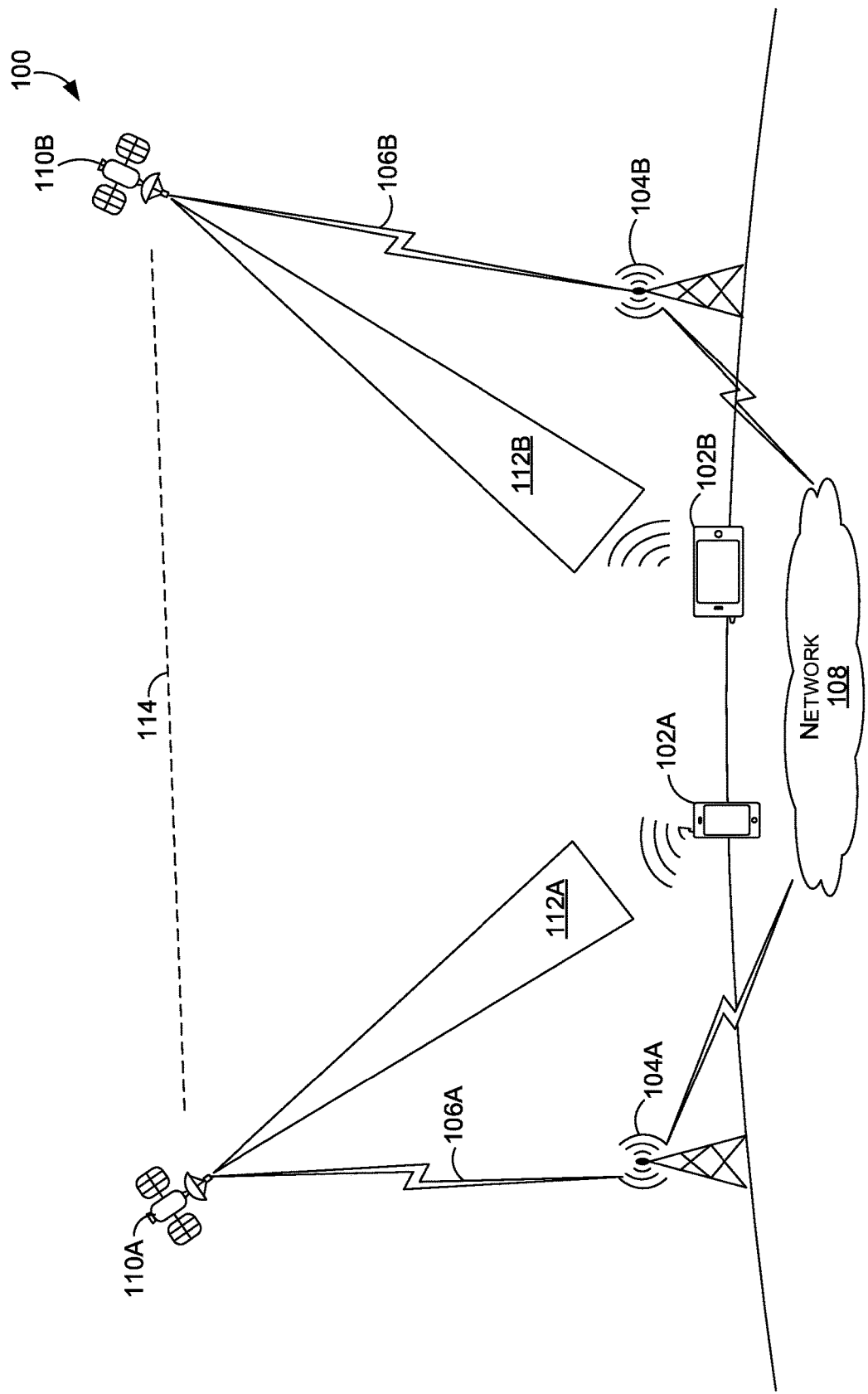
FIG. 1 depicts an example operating environment for user device signal directivity based on the orientation of the user device, in accordance with aspects herein.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

3G Third-Generation Cellular Communication System
4G Fourth-Generation Cellular Communication System
5G Fifth-Generation Cellular Communication System
CD-ROM Compact Disk Read Only Memory
CDMA Code Division Multiple Access
eNB Evolved Node B
gNB Next Generation Node B
GPRS General Packet Radio Service
GSM Global System for Mobile communications
DVD Digital Versatile Discs
EEPROM Electrically Erasable Programmable Read Only Memory
E-UTRA Evolved Universal Terrestrial Radio Access
FD-MIMO Full-Dimension Multiple-Input Multiple-Output
GPS Global Positioning System
IoT Internet of Things
LAN Local Area Network
LTE Long Term Evolution
MIMO Multiple-Input Multiple-Output
mm wave Millimeter wave
MME Mobility Management Entity
MU-MIMO Multi-User Multiple-Input Multiple-Output
NR New Radio
PC Personal Computer PDA Personal Digital Assistant
RAM Random Access Memory
RF Radio-Frequency
ROM Read Only Memory
RSRP Reference Signal Received Power
RSRQ Reference Transmission Receive Quality
RSSI Received Signal Strength Indicator
SNR Signal-to-Noise Ratio
SRS Sound Reference Signal
TDMA Time Division Multiple Access
VLAN Virtual Local Area Network In addition, words such as "a" and "an," unless otherwise indicated to the contrary, may also include the plural as well as the singular. Thus, for example, the constraint of "a feature" is satisfied where one or more features are present. Furthermore, the term "or" includes the conjunctive, the disjunctive, and both (a or b thus includes either a or b, as well as a and b).

Unless specifically stated otherwise, descriptors such as "first," "second," and "third," for example, are used herein without imputing or otherwise indicating any meaning of priority, physical order, arrangement in a list, or ordering in any way, but are merely used as labels to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

Further, the term "some" may refer to "one or more." Additionally, an element in the singular may refer to "one or more." The term "plurality" may refer to "more than one."

The term "combination" (e.g., one or more combinations thereof) may refer to, for example, "at least one of A, B, or C"; "at least one of A, B, and C"; "at least two of A, B, or C" (e.g., AA, AB, AC, BB, BA, BC, CC, CA, CB); "each of A, B, and C"; and may include multiples of A, multiples of B, or multiples of C (e.g., CCABB, ACBB, ABB, etc.). Other combinations may include more or less than three options associated with the A, B, and C examples.

As used herein, the phrase "based on" shall be construed as a reference to an open set of conditions. For example, an example step that is described as "based on X" may be based on both X and additional conditions, without departing from the scope of the present disclosure. In other words, as used herein, the phrase "based on" shall be construed in the same manner as the phrase "based at least in part on."

The term "mm wave," as used herein, may refer to the extremely high frequency band (e.g., from 30 GHz to 300 GHz). Additionally or alternatively, in some embodiments, a millimeter wave transmission may include one or more frequency ranges of 24 GHZ, 26 GHZ, 28 GHZ, 39 GHz, and 52.6-71 GHz.

The term "beam" may refer to wireless radio-frequency signals that are transmitted in a particular direction.

Additionally, a "user device," as used herein, is a device that has the capability of transmitting or receiving one or more signals to or from an access point, and may also be referred to as a "computing device," "mobile device," "user equipment," "wireless communication device," or "UE." A user device, in some aspects, may take on a variety of forms, such as a PC, a laptop computer, a tablet, a mobile phone, a PDA, a server, or any other device that is capable of communicating with other devices (e.g., by transmitting or receiving a signal). A user device may be, in an embodiment, user device 102A or 102B described herein with respect to FIG. 1, user device 202A, 202B, 202C, or 202D described herein with respect to FIG. 2, user device 302A, 302B, or 302C described herein with respect to FIG. 3, or user device 600 described herein with respect to FIG. 6.

In embodiments, a user device may include internet-of-things devices, such as one or more of the following: a sensor, controller (e.g., a lighting controller, a thermostat), appliances (e.g., a smart refrigerator, a smart air conditioner, a smart alarm system), other internet-of-things devices, or one or more combinations thereof. Internet-of-things devices may be stationary, mobile, or both. In some aspects, the user device is associated with a vehicle (e.g., a video system in a car capable of receiving media content stored by a media device in a house when coupled to the media device via a local area network). In some aspects, the user device comprises a medical device, a location monitor, a clock, other wireless communication devices, or one or more combinations thereof.

In some aspects, the user device is a wearable device having a camera, microphone, RFID, GPS, another sensor, or one or more combinations thereof. A wearable device (or another type of user device) can transmit the data obtained by their corresponding sensor(s) (e.g., to another user device, to a server). In embodiments, a user device can access sensors, application data, tracking data, map data, other user device data, or one or more combinations thereof, for packet transmissions (e.g., to another user device). In some embodiments, a wearable device can be a watch-type electronic device, a glasses-type wearable device, an upper-torso wearable device, another type of wearable device, or one or more combinations thereof.

In embodiments, a user device discussed herein may be configured to communicate using one or more of 4G (e.g., LTE), 5G, 6G, another generation communication system, or one or more combinations thereof. In some aspects, the user device may be an EN-DC user device. In some embodiments, the user device can connect to a 5G gNB that acts as a master node, and another type of node that acts as a secondary node.

A "wireless telecommunication service" refers to the transfer of information without the use of an electrical conductor as the transferring medium. Wireless telecommunication services may be provided by one or more telecommunication network providers. Wireless telecommunication services may include, but are not limited to, the transfer of information via radio waves (e.g., Bluetooth®), satellite communication, infrared communication, microwave communication, Wi-Fi, mm wave communication, and mobile communication. Embodiments of the present technology may be used with different wireless telecommunication technologies or standards, including, but not limited to, CDMA 1×Advanced, GPRS, Ev-DO, TDMA, GSM, WiMAX technology, LTE, LTE Advanced, other technologies and standards, or one or more combinations thereof.

A "network" (e.g., network 108 of FIG. 1) can provide one or more wireless telecommunication services and may transmit or receive a wireless signal to or from a user device. In embodiments, a network may be one or more telecommunications networks, or a portion thereof. The network might include an array of devices or components (e.g., one or more base stations). Additionally or alternatively, the network can include multiple networks, and the network can be a network of networks. In embodiments, the network or a portion thereof may be a core network, such as an evolved packet core or 5G core, which may include a control plane entity (e.g., a mobility management entity), a user plane entity (e.g., a serving gateway), and an access and mobility management function. In some embodiments, the network may comprise one or more public or private networks—wherein one or more of which may be configured as a satellite network (e.g., a 3GPP non-terrestrial network), a publicly switched telephony network, a cellular telecommunications network, another type of network, or one or more combinations thereof.

In embodiments, the network may comprise the satellite network connecting one or more gateways (e.g., a device or a system of components configured to provide an interface between the network and a satellite) to other networks, a cellular core network (e.g., a 4G, 5G, of 6G core network, an IMS network, and the like), a data network, another type of network, or one or more combinations thereof. In such embodiments, each of the satellite network and the cellular core network may be associated with a network identifier, such as a public land mobile network, a mobile country code, a mobile network code, or the like, wherein the network identifier associated with the satellite network is the same or different than the network identifier associated with the cellular network.

In embodiments, the network (including the satellite network) can connect one or more user devices to a service provider for services such as 5G and LTE, for example. In aspects, a service provided to a user device may comprise one or more of a voice service, a message service (e.g., SMS messages, MMS messages, instant messaging messages, an EMS service messages), a data service, other types of wireless telecommunication services, or one or more combinations thereof. The network can comprise any communication network providing voice, message, or data service(s), such as, for example, a 1× circuit voice, a 3G network (e.g., CDMA, CDMA2000, WCDMA, GSM, UMTS), a 4G network (WiMAX, LTE, HSDPA), a 5G network, a 6G network, another generation network, or one or more combinations thereof. Components of the network, for example, may include terminals, links, gateways, nodes (e.g., a core network node), relay devices, integrated access and backhaul nodes, other types of network components, or one or more combinations thereof.

As used herein, the term "base station" refers to a centralized component or system of components configured to wirelessly communicate (e.g., receive and/or transmit signals) with various devices or components (e.g., a user device, a relay device) in a particular geographical area. A base station may be referred to as one or more cell sites, nodes, gateways, remote radio unit control components, base transceiver stations, access points, NodeBs, eNBs, gNBs, Home NodeBs, Home eNodeBs, macro base stations, small cells, femtocells, relay base stations, another type of base station, or one or more combinations thereof. A base station may be, in an embodiment, similar to base stations 104A-104B described herein with respect to FIG. 1.

The term "satellite," as used herein, is an extraterrestrial base station that is distinguished from a terrestrial base station on the basis of its lack of ground coupling. Some examples of a satellite can include a space satellite, a balloon, a dirigible, an airplane, a drone, an unmanned aerial vehicle, a geosynchronous or geostationary earth orbit satellite, a low earth orbit satellite, a medium earth orbit satellite, a bent-pipe satellite, a regenerative satellite, another type of satellite, or one or more combinations thereof. A satellite may be, in an embodiment, similar to satellites 110A and 110B described herein with respect to FIG. 1, similar to satellites 210A, 210B, 210C, and 210D described herein with respect to FIG. 2, or similar to satellite 502 described herein with respect to FIG. 5.

Embodiments of the technology described herein may be embodied as, among other things, a method, system, or computer-program product. Accordingly, the embodiments may take the form of a hardware embodiment, or an embodiment combining software and hardware. An embodiment that takes the form of a computer-program product can include computer-useable instructions embodied on one or more computer-readable media.

Computer-readable media include both volatile and non-volatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal (e.g., a modulated data signal referring to a propagated signal that has one or more of its characteristics set or changed to encode information in the signal). Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Satellite RANs will be/are being integrated with cellular telecommunication networks (e.g., in a 3GPP-based system). In various topographies of a terrestrial geographical area, as well as during early phases of satellite deployments, there may be locations where a user device will be challenging for a satellite RAN to reach. Unlike stationary terrestrial base stations, connections between a UE and a satellite are subject to movement of the satellite station. Further, upon movement of the UE in addition to the satellite moving, the connections between the UE and satellite may be delayed. Unlike a terrestrial base station's coverage beam, a satellite's coverage beam may not sweep across the ground as the satellite traverses overhead and instead remains fixed over a given terrestrial geographical area. Furthermore, because of the ubiquitous network coverage between home PLMN and roaming PLMNs, a UE rarely expects to wholly depart a wireless coverage area-meaning that disruptions due to a lack of coverage are typically anomalous and temporary. As such, particularly during early deployments of satellite coverage, a connection between a UE and satellite that is successful and robust is desirable.

The integration of the satellite RANs with cellular telecommunication networks can result in high traffic load or congestion from numerous information relay and forwarding that can cause latency for UEs. Additionally or alternatively, this latency can result for user devices generating isotropic radiation patterns for detection by one or more satellites or other network nodes, the radiation patterns being uniform in various directions regardless of the direction of measurement. As such, if a user needs to make a call or establish a data session (e.g., for Internet browsing, a messaging service, Voice over IP, gaming, High Frequency Trading) via a user device, then it would be helpful for the user device to be generating signals towards one or more network nodes, rather than from a plurality of directions or in the wrong direction, which can cause battery resource waste and failures or delays in establishing the call or data session, for example.

Accordingly, aspects of the present disclosure are directed to improved user devices and improved UE and satellite connection establishments based on directing UE signal transmissions that have a higher likelihood of the satellite receiving those transmissions. In this way, UEs can achieve more success, robust communications links with one or more satellites. Additionally, the technology disclosed herein also provides for reduced user device battery consumption and reduction of expended resources due to the user device more efficiently and effectively achieving communication links, since the device no longer has to continue generating a plurality of beams in directions in which the satellite is not located. Furthermore, the technology disclosed herein can improve communications between or among user devices (and/or other devices) by improving both the quality of service and user experience. In this way, the technology and corresponding techniques disclosed herein can enhance the reliability and functionality of communications.

In an embodiment, a system is provided for UE antenna beam directivity. The system comprises a user device having antenna elements and at least one sensor, one or more processors communicatively coupled with the user device, and computer memory storing computer-usable instructions that, when executed by the one or more processors, cause the user device to perform operations. The operations of the user device comprise determining an orientation of the user device using the at least one sensor, the orientation of the user device being relative to the antenna elements and a gravitational force. Based on determining the orientation, the user device can transmit a signal (e.g., a radio frequency signal, a radio frequency pattern, a beam) towards a portion of an atmosphere layer using at least one of the antenna elements of the user device. In some embodiments, the at least one sensor is an accelerometer. In some embodiments, the user device has a plurality of accelerometers that include the at least one sensor. In some embodiments, one or more antenna elements of the user device are within a phased antenna array.

In another embodiment, a method for user device antenna beam directivity is provided. The method comprises receiving sensor data from a sensor of a user device, the sensor data corresponding to a gravitational force. Based on the sensor data, the user device can determine an orientation that is relative to at least a portion of an atmosphere layer of the Earth. Based on determining the orientation of the user device, the user device can transmit a signal from at least one antenna element of the user device towards the portion of the atmosphere layer. In some embodiments, the user device can also receive additional sensor data from the sensor of the user device and determine a second orientation of the user device (i.e., that the first determined orientation of the device has changed) relative to a detected gravitational force. Based on determining the second orientation, the user device can transmit another signal from a different antenna element of the user device towards the atmosphere layer or away from the gravitational force.

Another embodiment includes one or more non-transitory computer storage media having computer-executable instructions embodied thereon, that when executed by at least one processor, cause the at least one processor to perform a method. The method comprises receiving sensor data from a sensor of a user device, the sensor data corresponding to a gravitational force. Based on the sensor data, the user device can determine an orientation of the user device, the orientation of the user device being relative to each of a plurality of antenna elements of the user device and the gravitational force. Based on determining the orientation of the user device, the media can cause at least one antenna element of the plurality of antenna elements to transmit a signal in a direction away from the gravitational force.

Turning now to FIG. 1, example operating environment 100 is illustrated in accordance with one or more embodiments disclosed herein. At a high level, the example operating environment 100 comprises user devices 102A-102B, base stations 104A-104B, communication links 106A-106B corresponding to base stations 104A-104B and satellites 110A-110B, network 108, frequency bands 112A-112B corresponding to the satellites 110A-110B, and communication link 114 corresponding to satellites 110A-110B. Example operating environment 100 is but one example of a suitable environment for the technology and techniques disclosed herein, and is not intended to suggest any limitation as to the scope of use or functionality of the invention. Neither should the environment 100 be interpreted as having any dependency or requirement relating to any one or combination of components illustrated. For example, other embodiments of example operating environment 100 may have more or less user devices, base stations, satellites, or communication links. As another example, even though the user devices 102A-102B are illustrated in example operating environment 100 as a mobile phone, the user devices 102A-102B may also be another type of user device (e.g., a tablet, a wearable device). In yet another example, even though the satellites 110A-110B are illustrated in example operating environment 100 as satellite vehicles, the satellites 110A-110B may also be another type of satellite (e.g., a balloon or high altitude platform station, a dirigible, an airplane, a drone, an unmanned aerial vehicle).

User devices 102A-102B may be configured to wirelessly communicate (e.g., by transmitting or receiving one or more signals) with one or more base stations (e.g., base station 104A-104B), one or more satellites (e.g., satellites 110A-110B), other types of wireless telecommunication devices (e.g., core network nodes), or one or more combinations thereof. In example environment 100, network 108, base stations 104A-104B, satellites 110A-110B, or one or more combinations thereof, can provide one or more services (e.g., a data service (e.g., for Internet browsing, a Wi-Fi messaging service, Voice over IP, gaming, High Frequency Trading), a message service (e.g., SMS messages, MMS messages), an EMS service) to the user devices 102A-102B.

In embodiments, one or more of the user devices 102A-102B may include one or more of a unit, a station, a terminal, or a client, for example. In some embodiments, one or more of the user devices 102A-102B may act as a relay. In some embodiments, one or more of user devices 102A-102B may be a wireless local loop station, an IoT device, an Internet of Everything device, a machine type communication device, an evolved or enhanced machine type communication device, another type of user device, or one or more combinations thereof.

In embodiments, the base stations 104A-104B can be in different forms or can have different capabilities. For example, even though the base stations 104A-104B are illustrated in example operating environment 100 as macro base stations, one or more of the base stations 104A-104B may be another type of base station (e.g., a gateway node, such as a satellite dish). Further, the base stations 104A-104B may perform one or more of the following functions: transfer user data, radio channel ciphering, radio channel deciphering, integrity protection, header compression, mobility control functions (e.g., handover, dual connectivity), inter-cell interference coordination, connection setup and release, load balancing, distribution for non-access stratum messages, non-access stratum node selection, synchronization, RAN sharing, multimedia broadcast multicast service, subscriber and equipment trace, RAN information management, paging, positioning, delivery of a warning message, another type of base station functionality, or one or more combinations thereof.

Further, in some embodiments, one or more of base stations 104A-104B may communicate directly or indirectly (e.g., through the EPC 160 or 5G Core 190) with another base station over a backhaul link (e.g., using an X2 interface), which may be wired or wireless. In embodiments, one or more of the communication links 106A-106B (e.g., a feeder link) can connect one or more of the satellites 110A-110B to the network 108 (e.g., a 5G network or another generation network). In other embodiments, one or more of satellites 110A-110B can connect to the network 108 directly. As another example, in other embodiments, one or more of satellites 110A-110B can connect to a separate terrestrial gateway via a feeder link.

In some embodiments, one or more of satellites 110A-110B can connect to the network 108 via a network node embarked onboard the satellite 110A or 110B. For example, in embodiments wherein satellite 110A or 110B has the one or more network nodes embarked onboard, the network node can connect to the user device 102A or 102B via a service link using a Uu interface. In yet another example, one or more of the satellites 110A or 110B may have one or more access nodes, such as one or more gNB components (e.g., a gNB distributed unit) onboard the satellite. Accordingly, the user device 102A or 102B can transmit or receive signals to or from one or more of the satellites 110A or 110B.

The user device 102A or 102B, in some embodiments, can transmit or receive signals to or from the satellite 110A or 110B via one or more frequency bands (e.g., via frequency band 112A corresponding to satellite 110A or frequency band 112B corresponding to satellite 110B). Because the frequency bands 112A and 112B are transmitted by satellites 110A and 110B located within a portion of an atmosphere layer (e.g., an airplane in the troposphere between 0 kilometers and 12 kilometers, a high altitude balloon in the stratosphere between 18 kilometers and 21 kilometers, another type of satellite in the thermosphere between 80 kilometers and to 700 kilometers), it would be helpful for user devices (e.g., user devices 102A and 102B) to have antenna beam steering capabilities that direct signal transmission towards a portion of an atmosphere layer for reception by satellite 110A or 110B. In this way, by generating signals that are more generally directed towards one or more network nodes, rather than away from the network nodes or in the wrong direction, user devices can preserve battery and other resources, reduce failures or delays in establishing calls or data sessions, and enhance user experiences and user device functionalities.

In embodiments, prior to transmitting a signal to one or more of satellites 110A or 110B (e.g., an RRC connection request with one or more of satellites 110A or 110B based on a user device-satellite communications trigger), user device 102A or 102B can determine an orientation of the respective user device using at least one sensor of the user device. For example, the sensor may include an accelerometer capable of detecting a gravitational force and a direction of the gravitational force with respect to the location of the accelerometer, movement of the respective user device, a moving direction of the user device (e.g., a moving vector or acceleration vector), other types of accelerometer data, or one or more combinations thereof, which can be provided to one or more software components for analysis. For example, one or more accelerometers of one or more of user devices 102A and 102B can be coupled to one or more processors (e.g., a central processing unit) and memory of the user device, and a controller of the respective user device. The one or more accelerometers may be capable of detecting a direction and magnitude of force experienced by the controller, such as the gravitational field of the Earth acting on the controller. In some embodiments, the one or more of the accelerometers are coupled to a motherboard or integrated with a chipset.

In some embodiments, one or more of the user devices 102A and 102B also include other types of sensors, such as a gyroscope or magnetometer, for example. To illustrate, user device 102A or 102B may utilize gravitational force data detected by one or more accelerometers or one or more other types of sensors, user device rotational data (e.g., angular velocity), direction (e.g., magnetic north), user device GPS position data, GPS altitude data, barometer data, altimeter data, GPS speed data (e.g., a user device traveling at a particular speed while located within a vehicle), other types of user device orientation data, or one or more combinations thereof, for antenna beam steering capabilities for directing one or more signal transmissions towards a portion of an atmosphere layer for reception by satellite 110A or 110B. For example, the magnetometer can generate one or more signals indicating a relative position of the controller based on a strength or direction of a detected magnetic field of the Earth. In an embodiment, the position of the controller and the orientation data from the gyroscope, accelerometer, magnetometer, or one or more combinations thereof, can be used for identifying one or more antenna elements of the user device for beam steering towards a portion of an atmosphere layer or beam steering away from the gravitational force of the Earth (e.g., 180 degrees away from the gravitational force of the Earth or 190 degrees away from the gravitational force of the Earth).

In some embodiments, one or more additional output signals of the gyroscope, accelerometer, magnetometer, another type of user device sensor, or one or more combinations thereof, can used in a feedback loop mechanism to fine-tune the one or more signals (e.g., radio frequency, beam, or radiation pattern) transmitted by one or more antenna elements of the user device towards a portion of an atmosphere layer of the Earth, towards outer space, away from the Earth's crust or an interior portion of the Earth, away from a gravitational force, or one or more combinations thereof, even after the user device has been rotated after an initial transmission or while the user device is rotating during or after the initial transmission. For example, during transmission of one or more signals towards Earth's atmosphere or towards space based on an initial orientation determination corresponding to the antenna elements of the user device, the user device can determine a change to the user device orientation (e.g., based on accelerometer data, gyroscope data, magnetometer data) while the user device is transmitting the signals. Based on the detected orientation change, the user device can transmit the signals from another antenna element located at a different position on the user device.

In embodiments, user device 102A or 102B can transmit one or more licensed or unlicensed radio frequency band signals, or one or more combinations thereof, towards space or away from Earth's gravitational force based on the determined orientation of the user device (e.g., and based on a user device-satellite communications trigger, such that the user device is triggered to communicate with a satellite instead of a terrestrial network node). In some embodiments, user device 102A or 102B can transmit one or more signals corresponding to one or more of License Assisted Access, LTE-Unlicensed radio access technology, NR technology in an unlicensed band (e.g., 5 GHz industrial, scientific, and medical band), a 5 GHz industrial band, a 5 GHz scientific band, a 5 GHz medical band, a particular carrier aggregation configuration of a licensed band, another type of spectrum operation, or one or more combinations thereof. In some embodiments, while operating in unlicensed radio frequency bands, one or more of the user devices 102A and 102B may employ carrier sensing for collision avoidance and detection while transmitting the signals based on the orientation of the respective UE. In some embodiments, one of the UEs can transmit signals corresponding to ultra-reliable communications, low-latency communications, mission critical communications, ultra-reliable low-latency communications, ultra-reliable functions, low-latency functions, critical functions, mission critical push-to-talk functions, mission critical video functions, other types of communications, or one or more combinations thereof.

Additionally, based on the transmissions to the satellite 110A or 110B, the satellites 110A and 110B can broadcast services to UEs 102A and 102B and provide coverage, mission critical access (e.g., during an emergency situation), other types of satellite services, protocols, or functionality, or one or more combinations thereof. In embodiments, satellites 110A and 110B can be configured to communicate with each other (e.g., via communication link 114). For example, the communication link 114 may include a free space optical link, a microwave link, electromagnetic wave signals via mm wave signals, optical signals via a laser, another type of communication link, or one or more combinations thereof. As another example, the communication link 114 can correspond to a wireless common public radio interface protocol, a dedicated wireless front haul protocol developed for high-altitude-to-high-altitude, another protocol, or one or more combinations thereof.

In some embodiments, the orientation of the user device 102A is different from the orientation of the user device 102B. In some embodiments, the positioning of the antenna elements of user device 102A is different from the positioning of the antenna elements of user device 102B. In some embodiments, based on the orientation of user devices 102A and 102B (e.g., and based on a user device-satellite communications trigger, such that the user device is triggered to communicate with a satellite instead of a terrestrial network node), one or more additional antenna elements of user device 102A transmit signals to satellite 110A compared to the number of antenna elements of user device 102B transmitting signals to satellite 110B. In some embodiments, the orientation of user device 102A is further determined based on a Satellite Positioning System or Global Navigation Satellite System, such as GPS, GLObalnaya NAvigatsionnaya Sputnikovaya Sistema, Galileo, BeiDou, Indian Regional Navigation Satellite System, European Geostationary Navigation Overlay Service, Wide Area Augmentation System, another type of positioning technique, or one or more combinations thereof. In some embodiments, the antenna elements of user device 102A utilized for transmitting the signals based on the orientation of the user device 102A are also determined based on a concentration of one or more atmospheric gases (e.g., nitrogen, oxygen, argon, carbon dioxide, neon, helium, methane, krypton, ozone, hydrogen, water vapor), a carrier frequency of the frequency band 112A, ionospheric and tropospheric scintillation loss, solar activity levels, an orbit of the satellite 110A, another factor corresponding to the frequency band 112A or satellite 110A, or one or more combinations thereof. For example, the satellite 110A can transmit the concentration data of the one or more atmospheric gases, the carrier frequency data of the frequency band 112A, the ionospheric or tropospheric scintillation loss data, a solar activity level, an orbit of the satellite 110A, or one or more combinations thereof, to the user device 102A.

Figure 2:
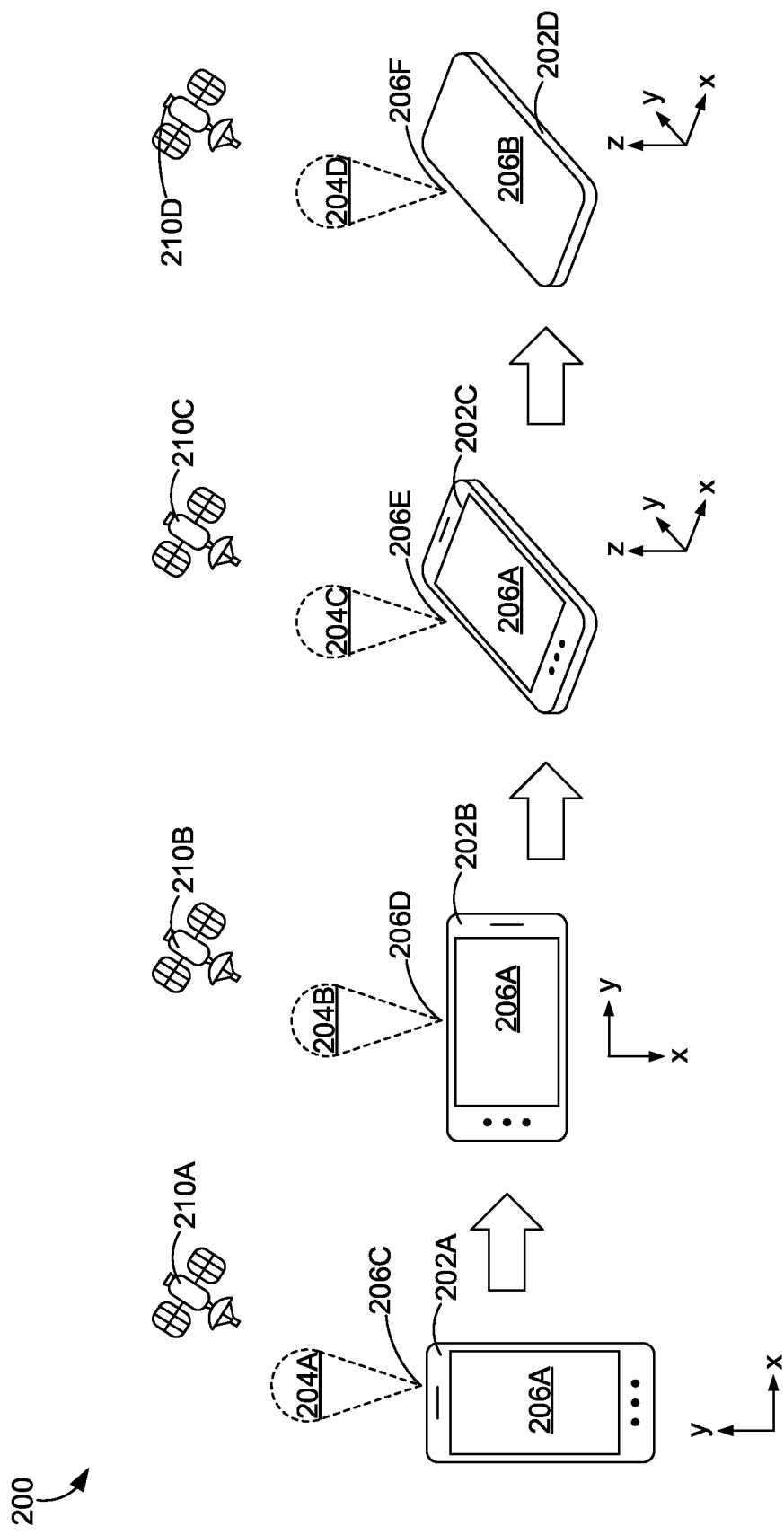
FIG. 2 depicts another example operating environment for user device signal directivity based on the orientation of the user device, in accordance with aspects herein.

Turning to FIG. 2, example operating environment 200 is illustrated in accordance with one or more embodiments disclosed herein. At a high level, the example operating environment 200 comprises user device 202A in a first orientation transmitting signal 204A in a direction corresponding to satellite 210A, user device 202B in a second orientation transmitting signal 204B in a direction corresponding to satellite 210B, user device 202C in a third orientation transmitting signal 204C in a direction corresponding to satellite 210C, and user device 202D in a fourth orientation transmitting signal 204D in a direction corresponding to satellite 210D. Example operating environment 200 is but one example of a suitable environment for the technology and techniques disclosed herein, and is not intended to suggest any limitation as to the scope of use or functionality of the invention. Neither should the environment 200 be interpreted as having any dependency or requirement relating to any one or combination of components illustrated.

For example, other embodiments of example operating environment 200 may have user devices in additional or alternative orientations and transmitting signals corresponding to a satellite (e.g., away from a gravitational force, towards an atmosphere layer, towards outer space). As another example, even though the user devices 202A-202D are illustrated in example operating environment 200 as a mobile phone, the user devices 202A-202D may also be another type of user device (e.g., a tablet, a wearable device). In yet another example, even though the satellites 210A-210D are illustrated in example operating environment 200 as satellite vehicles, one or more of the satellites 210A-210D may be another type of satellite (e.g., a balloon or high altitude platform station, a dirigible, an airplane, a drone, an unmanned aerial vehicle). In embodiments, user devices 202A-202D may be similar to user devices 102A and 102B described herein with reference to FIG. 1, and satellites 210A-210D may be similar to satellites 110A and 110B described herein with reference to FIG. 1.

In an embodiment, the user device 202A has a first orientation that can be determined by one or more sensors within or on the user device 202A, the user device 202B has a second orientation that can be determined by the one or more sensors, the user device 202C has a third orientation that can be determined by the one or more sensors, and the user device 202D has a fourth orientation that can be determined by the one or more sensors.

For example, in embodiments, based on the first orientation, the user device 202A transmits signal 204A in a direction corresponding to satellite 210A and based on one or more antenna elements associated with position 206C (e.g., the user device 202A transmitting the signal 204A based on a user device-satellite communications trigger, such that the user device is triggered to communicate with a satellite instead of a terrestrial network node). In the example first orientation of the user device 202A, the position 206C of the antenna elements used for transmitting the signal 204A corresponds to an x-y axis and an orientation of the graphical user interface 206A of the user device 202A. In some embodiments, the antenna elements associated with position 206C transmit the signal 204A based on an antenna diversity protocol or an antenna-based spatial ranging protocol. In some embodiments, the antenna elements associated with position 206C transmit the signal 204A based on a phased antenna array beam steering technique for adjusting a signal phase or magnitude for one or more antenna elements associated with the position 206C in which the signal 204A is transmitted. For example, position 206C may correspond to multiple antenna elements or one or more phased antenna arrays. In some embodiments, the one or more antenna elements corresponding to position 206C may be mounted along an edge of a housing of the user device 202A, under a dielectric window structure, under another type of antenna window structure, at one or more corners of a front housing wall (e.g., associated with the graphical user interface 206A) or rear housing wall, at another position within or on the user device 202A, or one or more combinations thereof.

In another example, in embodiments, based on the second orientation, the user device 202B transmits signal 204B in a direction corresponding to satellite 210B (e.g., away from a gravitational force, towards an atmosphere layer, towards outer space) and based on one or more antenna elements associated with position 206D. (For example, the user device 202B transmits the signal 204B further based on a user device-satellite communications trigger, such that the user device is triggered to communicate with a satellite instead of a terrestrial network node. To illustrate, the user device-satellite communications trigger may be based on the user device 202B attempting an RRC connection with a terrestrial node and the RRC connection was not established). In the example second orientation of the user device 202B, the position 206D of the antenna elements used for transmitting the signal 204B corresponds to an x-y axis and an orientation of the graphical user interface 206A of the user device 202B. In some embodiments, the antenna elements associated with position 206D transmit the signal 204B based on an antenna diversity protocol, an antenna-based spatial ranging protocol, or based on a phased antenna array beam steering technique for adjusting a signal phase or magnitude for one or more antenna elements associated with the position 206D in which the signal 204B is transmitted.

In some embodiments, position 206D may correspond to multiple antenna elements or one or more phased antenna arrays. In some embodiments, the one or more antenna elements corresponding to position 206D may be mounted along an edge of a housing of the user device 202B, under a dielectric window structure, under another type of antenna window structure, at one or more corners of a front housing wall (e.g., associated with the graphical user interface 206A) or rear housing wall, at another position within or on the user device 202B, or one or more combinations thereof. In some embodiments, a phased antenna array is located at the position 206D and includes a gain and phase adjustment circuitry for adjusting the signal 204B via each antenna element of the phased antenna array. In some embodiments, the phased antenna array includes one or more patch antennas, dipole antennas, dipole antennas with directors and reflectors (e.g., Yagi antennas, beam antennas), other types of antennas, or one or more combinations thereof. In some embodiments, a set of three antenna elements or more than three antenna elements are located at the position 206D for transmitting the signal 204B. In some embodiments, the user device 202B has one or more transmission lines between each of a plurality of antenna elements located on various positions of the user device 202B.

In yet another example, in embodiments, based on the third orientation, the user device 202C transmits signal 204C in a direction corresponding to satellite 210C (e.g., away from a gravitational force, towards an atmosphere layer, towards outer space) and based on one or more antenna elements associated with position 206E. In the example third orientation of the user device 202C, the position 206E of the antenna elements used for transmitting the signal 204C corresponds to an x-y-z axis and an orientation of the graphical user interface 206A of the user device 202C. Further, in embodiments, based on the fourth orientation, the user device 202D transmits signal 204D in a direction corresponding to satellite 210D (e.g., away from a gravitational force, towards an atmosphere layer, towards outer space) and based on one or more antenna elements associated with position 206F. In the example fourth orientation of the user device 202D, the position 206F of the antenna elements used for transmitting the signal 204D corresponds to an x-y-z axis and an orientation of the graphical user interface of the user device 202D. In some embodiments, one or more of the antenna elements associated with position 206E or 206F include one or more resonating elements (e.g., formed from a loop antenna structure, a patch antenna structure, an inverted-F structure, a slot structure, a monopole, a dipole, a helical antenna structure, a Yagi antenna structure, another type of antenna structure, or one or more combinations thereof).

Figure 3:
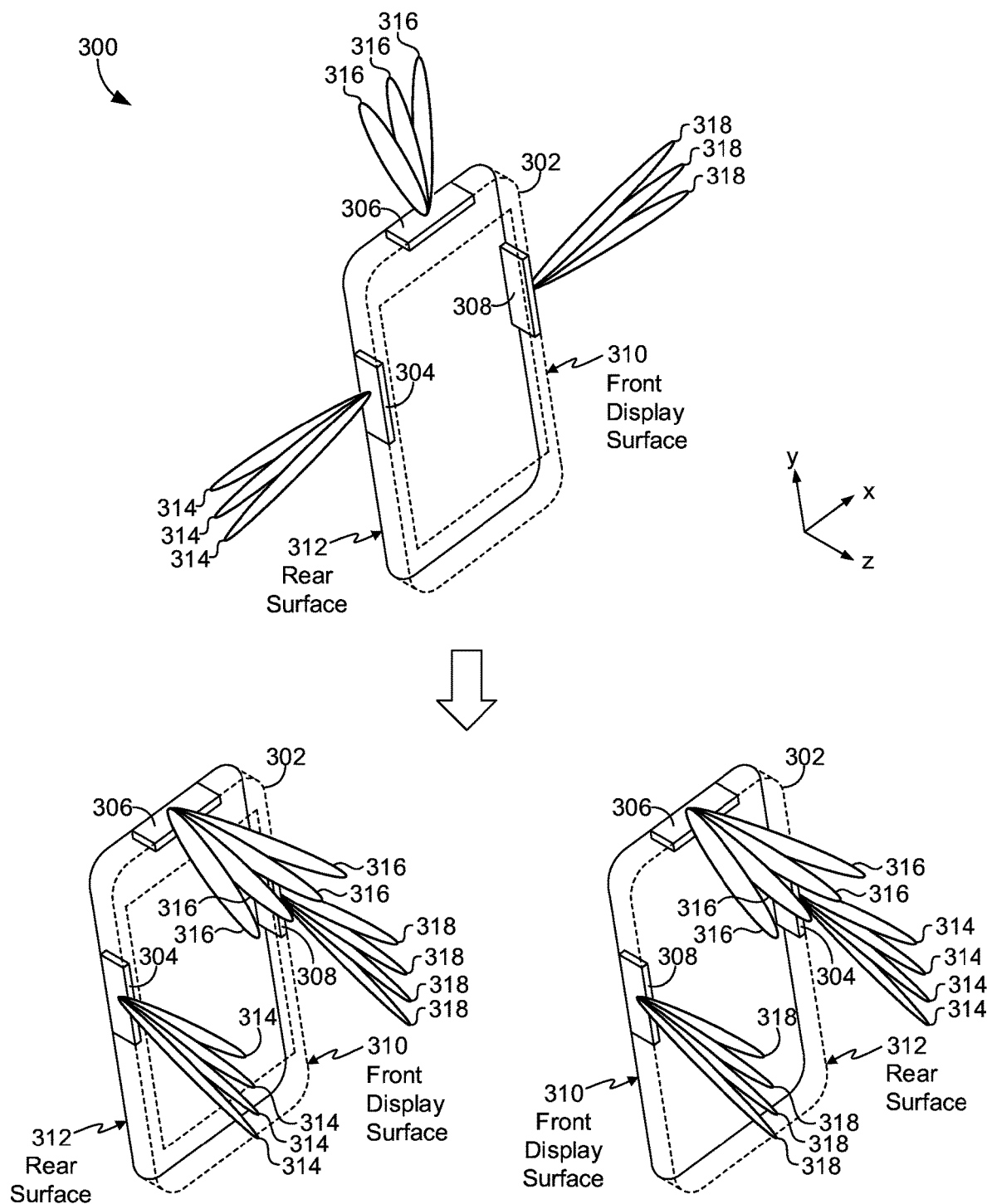
FIG. 3 illustrates another example environment for user device signal directivity based on the orientation of the user device, in accordance with aspects herein.

Turning to FIG. 3, example operating environment 300 is illustrated in accordance with one or more embodiments disclosed herein. Example environment 300 includes three examples of directions in which user device 302 can transmit signals (e.g., towards space or away from a gravitational force based on the orientation of the user device). The example operating environment 300 comprises user device 302 having a first antenna array 304 capable of transmitting a plurality of signals 314, a second antenna array 306 capable of transmitting a plurality of signals 316, and a third antenna array 308 capable of transmitting a plurality of signals 318. Each of the plurality of signals 314, 316, and 318 are transmitted by user device 302 in a direction corresponding to the front display surface 310 (e.g., a graphical user interface) and the rear surface 312 of the user device 302. The number of the plurality of signals 314, 316, and 318 may be based on a number of antenna elements within each of the antenna arrays 304, 306, and 308. For example, if the antenna array 306 has two antenna subarrays, the antenna array 306 may support four of signals 316. In some embodiments, one or more of the antenna elements of user device 302 are horizontally polarized, vertically polarized, have a circular polarization, another type of polarization, or one or more combinations thereof.

Example Flowcharts

Figure 4:
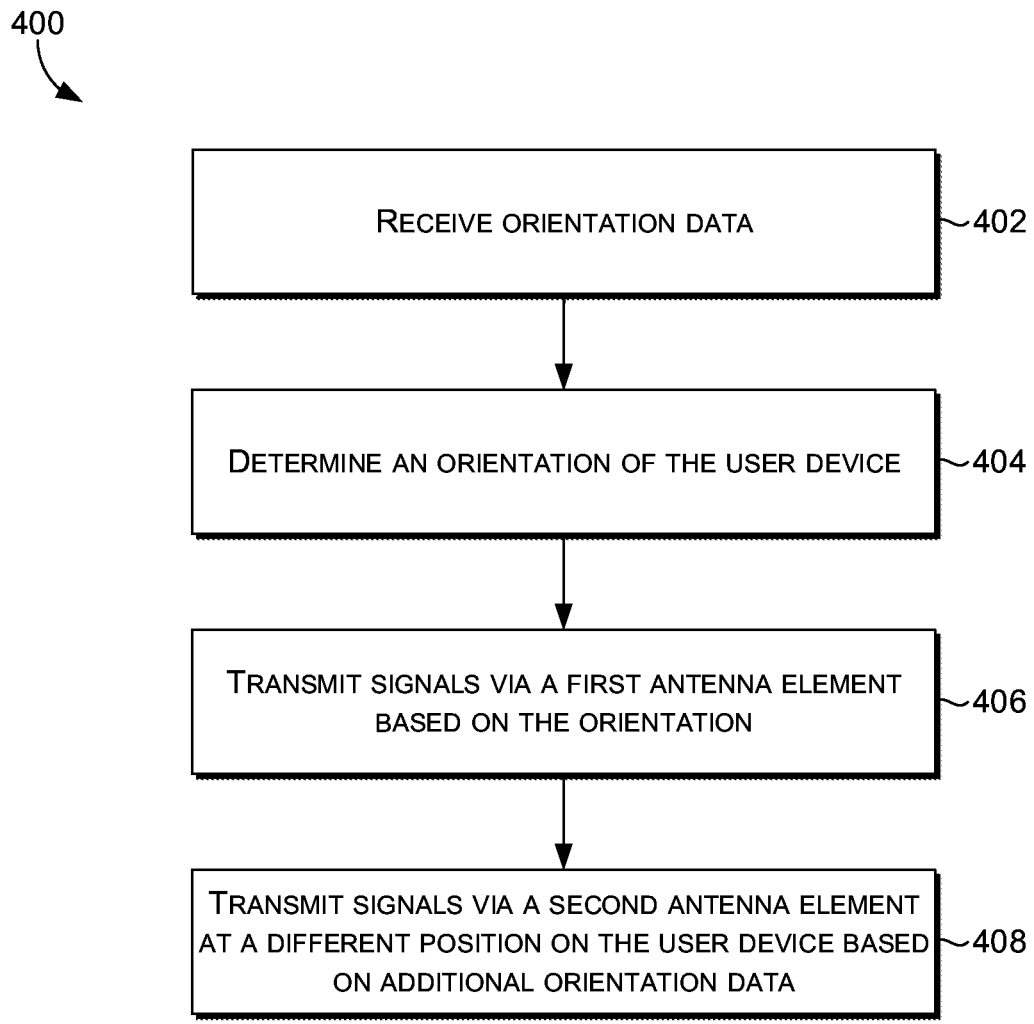
FIG. 4 illustrates an example flowchart for user device signal directivity, in accordance with aspects herein.

Having described the example embodiments discussed above, an example flowchart is described below with respect to FIG. 4. Example flowchart 400 begins at 402 with a user device receiving orientation data. For example, the user device can receive orientation data including accelerometer data, gyroscope data, GPS data, magnetometer data, and other types of orientation data. For example, the user device may have one or more accelerometers, gyroscopes, magnetometers, barometers, altimeters, other types of orientation sensors, or one or more combinations thereof. In embodiments, the one or more accelerometers are capable of detecting a gravitational force and a direction of the gravitational force with respect to one or more of the location of the accelerometer, movement of the respective user device, a moving direction of the user device (e.g., a moving vector or acceleration vector), other types of accelerometer data, or one or more combinations thereof. In embodiments, the one or more accelerometers may be capable of detecting a direction and magnitude of force experienced by the controller of the user device, such as the gravitational field of the Earth acting on the controller. In some embodiments, the orientation data may also include user device rotational data (e.g., angular velocity), direction data (e.g., magnetic north), user device GPS position data, GPS altitude data, barometer data, altimeter data, GPS speed data (e.g., a user device traveling at a particular speed while located within a vehicle), other types of user device orientation data, or one or more combinations thereof.

At 404, the user device can determine an orientation of the user device using the orientation data. For example, the orientation may be relative to the antenna elements of the user device and a gravitational force (e.g., detected by one or more accelerometers). In some embodiments, the user device has a plurality of accelerometers, receives accelerometer data from each of the plurality of accelerometers, and determines the orientation of the user device using the accelerometer data from each of the plurality of accelerometers. In some embodiments, the orientation of the user device is determined from sensor data corresponding to a gravitational force, and the orientation of the user device is relative to at least a portion of an atmosphere layer (e.g., the troposphere, the stratosphere, the mesosphere, the thermosphere, the exosphere, the edge of outer space). In some embodiments, the determined orientation of the user device is relative to each of a plurality of antenna elements of the user device and the gravitational force. In some embodiments, the orientation is determined relative to one or more geomagnetic fields, outer space, the Earth's crust (or a portion thereof), the Earth's core, another direction or reference point, or one or more combinations thereof.

At 406, the user device transmits one or more signals via one or more antenna elements of the user device based on the determined orientation. In embodiments, the user device transmits the one or more signals towards a portion of an atmosphere layer, away from a gravitational force, towards outer space, away from the Earth's crust (or a portion thereof), away from the Earth's core, towards or away from another direction or reference point, or one or more combinations thereof. In some embodiments, the user device transmits the one or more signals from the one or more antenna elements that are within a phased antenna array. In some embodiments, the user device transmits a beam from the antenna elements of a first phased antenna array of a plurality of phased antenna arrays of the user device. In some embodiments, the user device transmits the one or more signals that correspond to one or more of License Assisted Access, LTE-Unlicensed radio access technology, a 5 GHz industrial band, a 5 GHz scientific band, a 5 GHz medical band, a particular carrier aggregation configuration of a licensed band, an ultra-reliable communication, a low-latency communication, a mission critical communication, an ultra-reliable low-latency communication, another type of communication, or one or more combinations thereof.

At 408, the user device can transmit one or more signals via a second antenna element located at a different position on the user device based on receiving additional orientation data. For example, in some embodiments, the user device can receive one or more additional orientation data (e.g., from the gyroscope, accelerometer, magnetometer, another type of user device sensor, or one or more combinations thereof), that the user device can used in a feedback loop mechanism to fine-tune the one or more signals (e.g., radio frequency, beam, or radiation pattern) transmitted by one or more antenna elements of the user device towards a portion of an atmosphere layer of the Earth, towards outer space, away from the Earth's crust or an interior portion of the Earth, away from a gravitational force, away from or towards another direction or reference point, or one or more combinations thereof. In embodiments, the user device can transmit the additional signals even after the user device has been rotated after the initial transmission or while the user device is rotating during or after the initial transmission.

For example, in some embodiments, in response to transmitting the initial one or more signals from at least a first antenna element, the user device can determine a second orientation of the user device based on the additional orientation data received using at least one sensor of the user device. Based on based on determining the second orientation, the user device can transmit a second signal towards the atmosphere layer using a different antenna element. For example, the different antenna element can be located at a different position on the user device. In an embodiment, the second orientation may be detected while the initial signal is still being transmitted from the first antenna element.

As another example, the user device can receive orientation data including accelerometer data from each of a plurality of accelerometers located within or on the user device. Further, the user device can determine the orientation of the user device using the accelerometer data from each of the plurality of accelerometers. In addition, the user device can receive additional orientation data including additional accelerometer data from each of the plurality of accelerometers, and further determine the second orientation of the user device using the additional accelerometer data from each of the plurality of accelerometers. Based on based on determining the second orientation, the user device can transmit one or more signals (e.g., towards the atmosphere layer) using a different antenna element.

In an embodiment, the antenna elements of the user device may be within a plurality of phased antenna arrays, and the signal transmitted by the user device based on a determined orientation of the user device may be a beam that is transmitted via a first phased antenna array of a plurality of phased antenna arrays of the user device. In addition, the user device may determine a second orientation of the user device using at least one sensor (e.g., an accelerometer) in response to transmitting the beam via the first phased antenna array. Further, the user device can transmit, based on determining the second orientation, a second beam (e.g., towards the atmosphere layer) using a second phased antenna array of the plurality of phased antenna arrays. In addition, the user device can also stop or pause the transmission of the beam via the first phased antenna array based on determining the second orientation. Continuing this example, the user device may also determine, in response to transmitting the second beam via the second phased antenna array, a third orientation of the user device using the at least one sensor. Additionally, the user device may also transmit a third beam, based on determining the third orientation, (e.g., towards the atmosphere layer) and stop the transmission of the second beam via the second phased antenna array.

In an embodiment, the user device may receive additional sensor data from a sensor of the user device and detect a change in the orientation of the user device based on the additional sensor data. Based on the detected change in orientation, the user device can determine a second orientation of the user device, the second orientation of the user device being relative to the gravitational force. In some embodiments, the second orientation of the user device is relative to each of the plurality of antenna elements of the user device and the gravitational force. Based on determining the second orientation of the user device, the user device may transmit a second signal from a different antenna element of the user device towards the atmosphere layer. In some embodiments, the second orientation is detected while the signal is still being transmitted by the at least one antenna element.

Example Satellite

Having described the example embodiments discussed above of the presently disclosed technology, an example operating environment of an example satellite (e.g., satellite 110A or 110B of FIG. 1) is described below with respect to FIG. 5. Example environment 500 is but one example of a suitable satellite environment, and is not intended to suggest any particular limitation as to the scope of use or functionality of the technology disclosed. Neither should example satellite 502 be interpreted as having any dependency or requirement relating to any particular component illustrated, or a particular combination of the components illustrated in FIG. 5.

Figure 5:
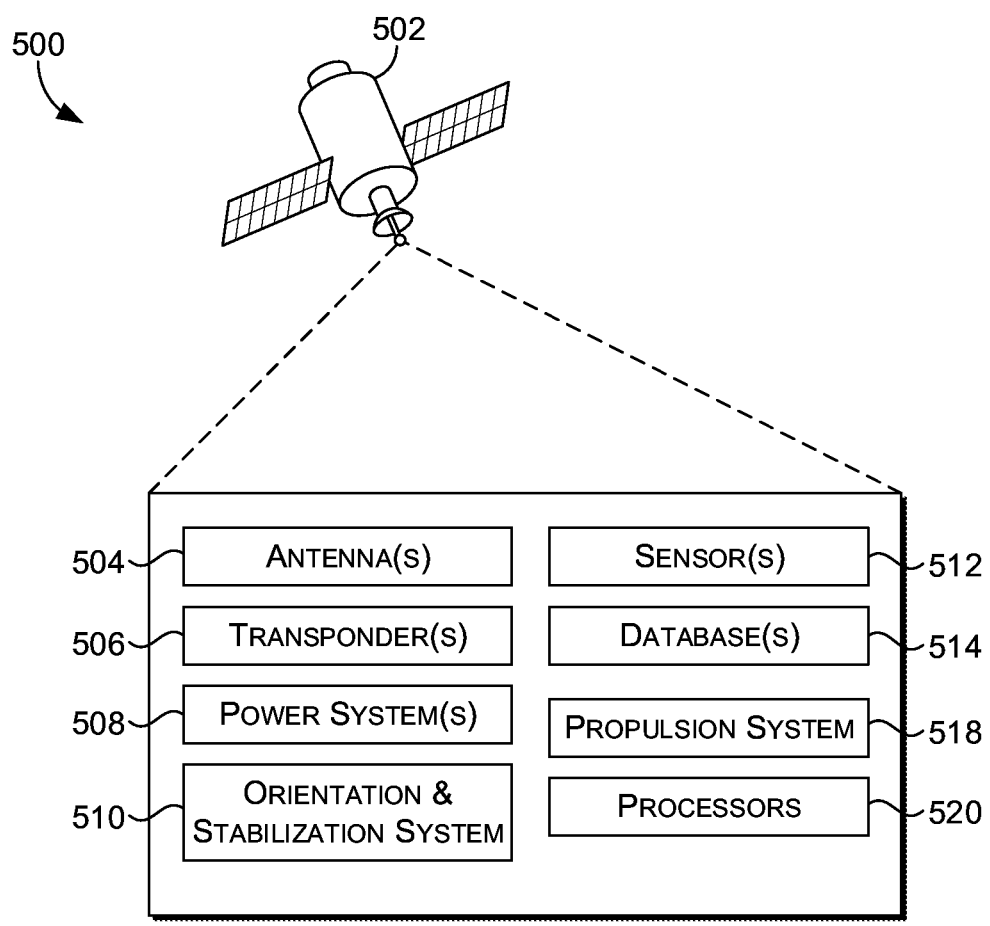
FIG. 5 depicts an example satellite for use in implementations of the present disclosure, in accordance with aspects herein.

As illustrated in FIG. 5, example satellite 502 includes antenna(s) 504, transponder(s) 506, power system(s) 508, an orientation and stabilization system 510, sensor(s) 512, database(s) 514, propulsion system 518, and processor(s) 520. The antenna(s) 504 of the satellite 502 can be configured to communicate with user devices, gateways, other satellites, other nodes, or one or more combinations thereof. The antenna(s) 504 may be based on one or more antenna elements (e.g., monopoles or dipoles, loop antennas, helical antennas, patch antennas, inverted-F antennas, Yagi antennas, slot antennas, horn antennas, cavity antennas) and can be used in one or more antenna arrays (e.g., phased antenna arrays, fixed direct radiating arrays, deployable direct radiating antenna arrays, space fed arrays, reflector fed arrays). For example, the antenna(s) 504 can receive signal transmissions from user devices and can communicate location data to the user devices associated with a Satellite Positioning System or Global Navigation Satellite System, concentration data of one or more atmospheric gases detected by the satellite 502, carrier frequency data, ionospheric or tropospheric scintillation loss data detected by satellite 502, a solar activity level detected by one or more sensors 512, an orbit of the satellite 502, or one or more combinations thereof.

Transceiver circuitry of the satellite 502 may include transponder(s) 506 capable of receiving uplink signals and capable of transmitting downlink signals. For example, the transponder(s) 506 may receive, amplify, or retransmit one or more signals between the satellite 502 and a gateway or user device, for example. As another example, one or more of the transponder(s) 506 can operate within a particular frequency band. In some embodiments, the transponder(s) 506 can perform a bent-pipe transmission. In some embodiments, one or more of the transponder(s) 506 can operate in a single-channel per carrier mode, a time-division multiple access mode, another type of mode, or one or more combinations thereof.

The power system(s) 508 can supply power to the satellite 502. For example, the power system(s) 508 may include one or more solar panels, one or more arrays of solar panels, power regulator circuitry, one or more batteries (e.g., silver zinc cell, lithium cell, solar cell), another type of power system component, or one or more combinations thereof. The power system(s) may also store electrical power generated from solar energy. The orientation and stabilization system 510 can act as a stabilizer (e.g., spin stabilization or three-axis (e.g., yaw axis, roll axis, and pitch axis) stabilization). The orientation and stabilization system 510 may also modify or control the spin and rotation of the satellite 502 (e.g., speed of rotation).

The sensor(s) 512 may include a sun sensor for detecting the director or position of the sun, an earth sensor for detecting the direction or position of the earth, light-based sensors (e.g., infrared sensors, visible light sensors, ultraviolet sensors), LIDAR, radar, backscattered light or backscattered radio-frequency signal sensors, temperature sensors, radiation sensors, accelerometers, gyroscopes, magnetic sensors, spectrometers, microwave sensors, particle detectors, another type of sensor, or one or more combinations thereof. The database(s) 514 may include one or more of a telemetry database, a payload database, an orbital database, a command and control database, a mission planning database, a reference database (e.g., for storing celestial data), a ground station database (e.g., for storing data from communications with terrestrial devices), another type of database, or one or more combinations thereof.

The propulsion system 518 can control the orbit of the satellite 502. For example, the propulsion system 518 can correspond to chemical propulsion, electric propulsion, compressed gas propulsion, hybrid propulsion, another type of propulsion, or one or more combinations thereof. The processor(s) 520 can be utilized by or for one or more of the antenna(s) 504, transponder(s) 506, power system(s) 508, orientation and stabilization system 510, sensor(s) 512, database(s) 514, propulsion system 518, another satellite component, or one or more combinations thereof. For example, the processor(s) 520 can process sensor data and determine the next satellite pass parameter. In an example embodiment, the processor(s) 520 can be a central processing unit, a digital signal processor, a field-programmable gate array, a graphics processing unit, a system-on-chip, a radiation-tolerant processor, another type of processor, or one or more combinations thereof.

Example User Device

Having described the example embodiments discussed above of the presently disclosed technology, an example operating environment of an example user device (e.g., user device 102A of FIG. 1) is described below with respect to FIG. 6. User device 600 is but one example of a suitable computing environment, and is not intended to suggest any particular limitation as to the scope of use or functionality of the technology disclosed. Neither should user device 600 be interpreted as having any dependency or requirement relating to any particular component illustrated, or a particular combination of the components illustrated in FIG. 6.

Figure 6:
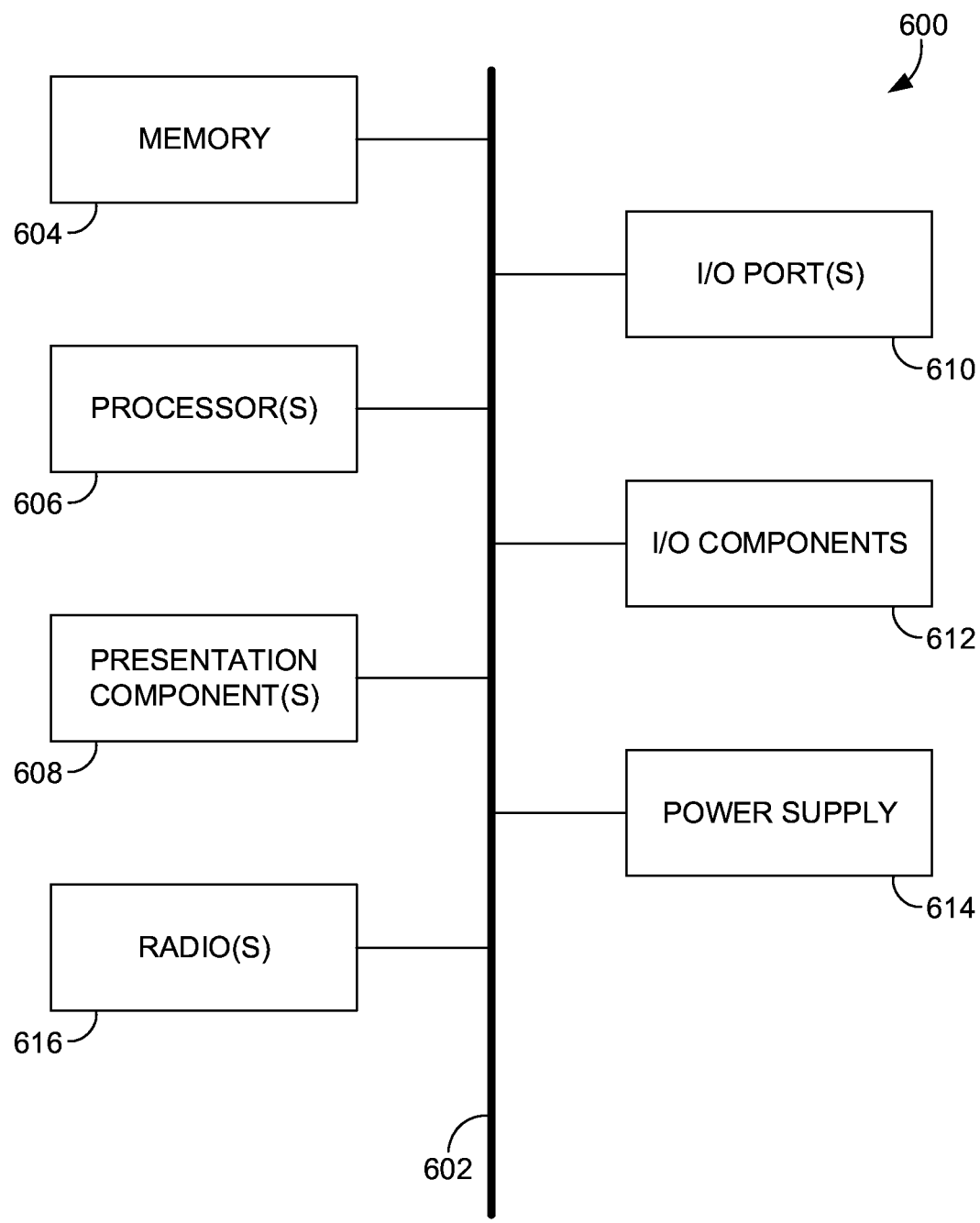
FIG. 6 depicts an example user device suitable for use in implementations of the present disclosure, in accordance with aspects herein.

As illustrated in FIG. 6, example user device 600 includes a bus 602 that directly or indirectly couples the following devices: memory 604, one or more processors 606, one or more presentation components 608, one or more input/output (I/O) ports 610, one or more I/O components 612, a power supply 614, and one or more radios 616.

Bus 602 represents what may be one or more busses (such as an address bus, data bus, or combination thereof). Although the various blocks of FIG. 6 are shown with lines for the sake of clarity, in reality, these blocks represent logical, not necessarily actual, components. For example, one may consider a presentation component, such as a display device, to be an I/O component. Also, processors have memory. Accordingly, FIG. 6 is merely illustrative of an exemplary user device that can be used in connection with one or more embodiments of the technology disclosed herein.

User device 600 can include a variety of computer-readable media. Computer-readable media can be any available media that can be accessed by user device 600 and may include both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information, such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by user device 600. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. One or more combinations of any of the above should also be included within the scope of computer-readable media.

Memory 604 includes computer storage media in the form of volatile and/or nonvolatile memory. The memory 604 may be removable, non-removable, or a combination thereof. Example hardware devices of memory 604 may include solid-state memory, hard drives, optical-disc drives, other hardware, or one or more combinations thereof. As indicated above, the computer storage media of the memory 604 may include RAM, Dynamic RAM, ROM, EEPROM, flash memory or other memory technology, CD-ROM, a cache memory, DVDs or other optical disk storage, magnetic cassettes, magnetic tape, magnetic disk storage or other magnetic storage devices, a short-term memory unit, a long-term memory unit, any other medium which can be used to store the desired information and which can be accessed by user device 600, or one or more combinations thereof.

The one or more processors 606 of user device 600 can read data from various entities, such as the memory 604 or the I/O component(s) 612. The one or more processors 606 may include, for example, one or more microprocessors, one or more CPUs, a digital signal processor, one or more cores, a host processor, a controller, a chip, a microchip, one or more circuits, a logic unit, an integrated circuit (IC), an application-specific IC (ASIC), any other suitable multi-purpose or specific processor or controller, or one or more combinations thereof. In addition, the one or more processors 606 can execute instructions, for example, of an operating system of the user device 600 or of one or more suitable applications.

The one or more presentation components 608 can present data indications via user device 600, another user device, or a combination thereof. Example presentation components 608 may include a display device, speaker, printing component, vibrating component, another type of presentation component, or one or more combinations thereof. In some embodiments, the one or more presentation components 608 may comprise one or more applications or services on a user device, across a plurality of user devices, or in the cloud. The one or more presentation components 608 can generate user interface features, such as graphics, buttons, sliders, menus, lists, prompts, charts, audio prompts, alerts, vibrations, pop-ups, notification-bar or status-bar items, in-app notifications, other user interface features, or one or more combinations thereof.

The one or more I/O ports 610 allow user device 600 to be logically coupled to other devices, including the one or more I/O components 612, some of which may be built in. Example I/O components 612 can include a microphone, joystick, game pad, satellite dish, scanner, printer, wireless device, and the like. The one or more I/O components 612 may, for example, provide a natural user interface (NUI) that processes air gestures, voice, or other physiological inputs generated by a user. In some instances, the inputs the user generates may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with the one or more presentation components 608 on the user device 600.

In some embodiments, the user device 600 may be equipped with one or more imaging devices, such as one or more depth cameras, one or more stereoscopic cameras, one or more infrared cameras, one or more RGB cameras, another type of imaging device, or one or more combinations thereof, (e.g., for gesture detection and recognition). Additionally, the user device 600 may, additionally or alternatively, be equipped with one or more accelerometers, gyroscopes, magnetometers, cameras, capacitance sensors, proximity sensors (e.g., an infrared proximity sensor or a capacitive proximity sensor), another type of motion or orientation sensor, or one or more combinations thereof. In some embodiments, the output of the motion or orientation sensors may be provided to the one or more presentation components 608 of the user device 600 to render immersive augmented reality or virtual reality.

The power supply 614 of user device 600 may be implemented as one or more batteries or another power source for providing power to components of the user device 600. In embodiments, the power supply 614 can include an external power supply, such as an AC adapter or a powered docking cradle that supplements or recharges the one or more batteries. In aspects, the external power supply can override one or more batteries or another type of power source located within the user device 600.

Some embodiments of user device 600 may include one or more radios 616 (or similar wireless communication components). The one or more radios 616 can transmit, receive, or both transmit and receive signals for wireless communications. In embodiments, the user device 600 may be a wireless terminal adapted to receive communications and media over various wireless networks. User device 600 may communicate using the one or more radios 616 via one or more wireless protocols, such as code division multiple access ("CDMA"), global system for mobiles ("GSM"), time division multiple access ("TDMA"), another type of wireless protocol, or one or more combinations thereof. In embodiments, the wireless communications may include one or more short-range connections (e.g., a Wi-Fi® connection, a Bluetooth connection, a near-field communication connection), a long-range connection (e.g., CDMA, GPRS, GSM, TDMA, 802.16 protocols), or one or more combinations thereof. In some embodiments, the one or more radios 616 may facilitate communication via radio frequency signals, frames, blocks, transmission streams, packets, messages, data items, data, another type of wireless communication, or one or more combinations thereof.

The one or more radios 616 may be capable of transmitting, receiving, or both transmitting and receiving wireless communications via mm waves, FD-MIMO, massive MIMO, 3G, 4G, 5G, 6G, another type of Generation, 802.11 protocols and techniques, another type of wireless communication, or one or more combinations thereof. For example, the one or more radios 616 may be capable of handling wireless communications in frequency ranges such as a low-band communication from 600 to 960 MHz, a mid-band communication from 1710 to 2170 MHz, a high band communication from 2300 to 2700 MHZ, an ultra-high band communication from 3400 to 3700 MHZ, another communication band between 600 MHz and 4000 MHZ, another suitable frequency, or one or more combinations thereof. The one or more radios 616 may also be capable of handling voice data and non-voice data.

In some embodiments, the user device 600 has one or more phased antenna arrays and beam steering techniques. For example, the techniques may include antenna signal phasing or magnitudes of the antenna elements that can be adjusted for beam steering to direct signals away from a gravitational force of the Earth or towards space. In some embodiments, the antenna elements of one or more antenna arrays can have diversity schemes for switching usage of one or more of the antenna elements. For example, in some embodiments, one or more of the antenna elements may include resonating elements (e.g., formed from loop antenna structures, patch antenna structures, stacked patch antenna structures, antenna structures having parasitic elements, inverted-F antenna structures, slot antenna structures, planar inverted-F antenna structures, monopoles, dipoles, helical antenna structures, Yagi (Yagi-Uda) antenna structures, surface integrated waveguide structures, another type of antenna structure, or one or more combinations thereof).

In some embodiments, one or more of the antenna elements may include a cavity-backed antenna. In some embodiments, different types of antennas may be used for different bands and combinations of bands. As an example, one type of antenna may be used to form a local wireless link antenna, and another type of antenna may be used to form a remote wireless link antenna. In some embodiments, one or more dedicated antennas may be used for receiving satellite navigation system signals or other types of satellite signals. In some embodiments, one or more antenna elements can be configured to receive both satellite signals and signals for other communications bands (e.g., terrestrial-based network signals). In some embodiments, one or more antenna elements can be arranged in particular phased antenna arrays for handling millimeter wave and centimeter wave communications.

In some embodiments, the user device 600 may have one or more transmission lines to route antenna signals for transmission towards space or away from a gravitational force, wherein the transmission lines include one or more coaxial cable paths, micro-strip transmission lines, strip-line transmission lines, edge-coupled micro-strip transmission lines, edge-coupled strip-line transmission lines, waveguide structures (e.g., coplanar waveguides, grounded coplanar waveguides), other types of transmission lines, or one or more combinations thereof. In some embodiments, one or more transmission lines can include a transmission line conductor (e.g., a ground or signal conductor), a transmission line conductor integrated into a rigid or flexible printed circuit board, a transmission line conductor integrated into a multilayer laminated structure (e.g., copper and a dielectric material), another type of integrated transmission line, or one or more combinations thereof. In some embodiments, one or more of the transmission lines may be interposed with filter circuitry, switching circuitry, impedance matching circuitry, another type of circuitry, or one or more combinations thereof.

In some embodiments, the user device 600 may have one or more sensors incorporated into one or more of the antenna elements or phased antenna arrays. In some embodiments, the user device 600 has a plurality of phased antenna arrays in different locations within or on the user device 600. In some embodiments, the user device 600 has an unblocked phased antenna array capable of being switched into use upon one or more orientation determinations. In some embodiments, the user device 600 has one or more radio-frequency phase and magnitude controllers for controlling each of the antenna elements and capable of adjusting the phase of the radio-frequency signals on one or more transmission line paths.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software. For instance, various functions may be carried out by a processor executing instructions stored in memory. As such, other arrangements and elements (for example, machines, interfaces, functions, orders, and groupings of functions, and the like) can be used in addition to, or instead of, those shown.

Embodiments of the present disclosure have been described with the intent to be illustrative rather than restrictive. Embodiments described in the paragraphs above may be combined with one or more of the specifically described alternatives. In particular, an embodiment that is claimed may contain a reference, in the alternative, to more than one other embodiment. The embodiment that is claimed may specify a further limitation of the subject matter claimed. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

The invention claimed is:

1. A system for antenna beam directivity, the system comprising:
   a user device having antenna elements and at least one sensor;
   one or more processors communicatively coupled with the user device; and
   computer memory storing computer-usable instructions that, when executed by the one or more processors, cause the user device to perform operations comprising:
      determining an orientation of the user device using the at least one sensor, the orientation of the user device being relative to the antenna elements and a gravitational force; and
      based on determining the orientation, establishing a connection with a non-terrestrial access node for a telecommunication service by using at least one of the antenna elements to transmit a connection request to the non-terrestrial access node.

2. The system according to claim 1, wherein the at least one sensor is an accelerometer, the operations further comprising transmitting a data item using the telecommunication service provided by the non-terrestrial access node based on the connection request.

3. The system according to claim 1, the operations further comprising:
   in response to establishing the connection, determining a second orientation of the user device using the at least one sensor; and
   based on determining the second orientation, transmitting a signal towards the non-terrestrial access node using a different antenna element.

4. The system according to claim 3, wherein the second orientation is detected while the connection is still being established.

5. The system according to claim 4, further comprising a plurality of accelerometers that include the at least one sensor, the operations further comprising:
   receiving accelerometer data from each of the plurality of accelerometers and determining the orientation of the user device using the accelerometer data from each of the plurality of accelerometers; and
   receiving additional accelerometer data from each of the plurality of accelerometers and determining the second orientation of the user device using the additional accelerometer data from each of the plurality of accelerometers.

6. The system according to claim 1, wherein the antenna elements of the user device are within a phased antenna array.

7. The system according to claim 1, wherein the antenna elements of the user device are within a plurality of phased antenna arrays, wherein the connection is established by transmitting a beam via a first phased antenna array of the plurality of phased antenna arrays, and wherein the operations further comprise:
   in response to transmitting the beam via the first phased antenna array, determining a second orientation of the user device using the at least one sensor; and
   based on determining the second orientation, transmitting a second beam towards the non-terrestrial access node using a second phased antenna array of the plurality of phased antenna arrays and stopping the transmission of the beam via the first phased antenna array.

8. The system according to claim 7, the operations further comprising:
   in response to transmitting the second beam via the second phased antenna array, determining a third orientation of the user device using the at least one sensor; and
   based on determining the third orientation, transmitting a third beam towards the non-terrestrial access node and stopping the transmission of the second beam via the second phased antenna array.

9. A method for user device antenna beam directivity, the method comprising:
   receiving sensor data from a sensor of a user device, the sensor data corresponding to a gravitational force;
   based on the sensor data, determining an orientation of the user device, the orientation of the user device being relative to at least a portion of an atmosphere layer; and
   based on determining the orientation of the user device, transmitting a connection establishment request from at least one antenna element of the user device towards the portion of the atmosphere layer to utilize a telecommunication service through a non-terrestrial network node instead of a terrestrial network node.

10. The method according to claim 9, wherein the connection establishment request is transmitted by a phased antenna array of the user device, the phased antenna array including the at least one antenna element, the operations further comprising transmitting a data item, based on the orientation, through another antenna element of the phased antenna array using the telecommunication service provided by the non-terrestrial network node.

11. The method according to claim 9, wherein the sensor is an accelerometer, the method further comprising determining the orientation of the user device using accelerometer data received from a plurality of accelerometers of the user device.

12. The method according to claim 9, further comprising:
receiving additional sensor data from the sensor of the user device;
based on the additional sensor data, detecting a change in the orientation of the user device;
determining a second orientation of the user device based on the change in the orientation, the second orientation of the user device being relative to the gravitational force; and
based on determining the second orientation of the user device, transmitting a second signal from a different antenna element of the user device towards the atmosphere layer.

13. The method according to claim 12, wherein the second orientation is detected while the connection establishment request is still being transmitted by the at least one antenna element, wherein the connection establishment request is transmitted via a first phased antenna array of the user device, and wherein the second signal is transmitted from the different antenna element that corresponds to a second phased antenna array of the user device.

14. The method according to claim 12, further comprising receiving the additional sensor data from the sensor and an accelerometer of the user device, and wherein the change in the orientation of the user device is determined based on the additional sensor data from the sensor and the accelerometer.

15. One or more non-transitory computer storage media having computer-executable instructions embodied thereon, that when executed by at least one processor, cause the at least one processor to perform a method comprising:
receiving sensor data from a sensor of a user device, the sensor data corresponding to a gravitational force;
based on the sensor data, determining an orientation of the user device, the orientation of the user device being relative to each of a plurality of antenna elements of the user device and the gravitational force;
based on the orientation of the user device, identifying one or more of the plurality of antenna elements for communicating with a non-terrestrial access node instead of a terrestrial access node; and
based on determining the orientation of the user device, causing the one or more of the plurality of antenna elements to transmit a signal in a direction associated with the non-terrestrial access node for radio access technology communications with the non-terrestrial access node instead of the terrestrial access node.

16. The one or more non-transitory computer storage media of claim 15, further comprising determining the orientation of the user device using sensor data received from the sensor, a magnetometer, and a plurality of accelerometers of the user device.

17. The one or more non-transitory computer storage media of claim 15, wherein the signal is transmitted by a phased antenna array of the user device, the phased antenna array including the one or more of the plurality of antenna elements.

18. The one or more non-transitory computer storage media of claim 17, wherein the user device includes a plurality of phased antenna arrays that each include at least one of the plurality of antenna elements.

19. The one or more non-transitory computer storage media of claim 15, the method further comprising:
receiving additional sensor data from the sensor of the user device; and
based on the additional sensor data, detecting a change in the orientation of the user device, wherein the change is detected while the signal is still being transmitted by the one or more of the plurality of antenna elements.

20. The one or more non-transitory computer storage media of claim 19, the method further comprising:
determining a second orientation of the user device based on the change in the orientation, the second orientation of the user device being relative to each of the plurality of antenna elements and the gravitational force; and
based on determining the second orientation of the user device, transmitting a second signal from a different antenna element of the user device away from the gravitational force.

\* \* \* \* \*